(12) United States Patent
Nguyen Phuoc et al.

(10) Patent No.: US 6,680,599 B2
(45) Date of Patent: Jan. 20, 2004

(54) SYSTEM FOR LIMITATION OF THE OUTPUT CURRENT FROM A SPEED CONTROLLER

(75) Inventors: Vinh Tung Nguyen Phuoc, Boulogne-Bill. (FR); Ayman Youssef, Grenoble (FR); Carlos Canuda De Wit, Saint Ismier (FR)

(73) Assignee: Schneider Electric Industries SA (FR)

( * ) Notice: Subject to any disclaimer, the term of this patent is extended or adjusted under 35 U.S.C. 154(b) by 0 days.

(21) Appl. No.: 10/026,550

(22) Filed: Dec. 27, 2001

(65) Prior Publication Data
US 2002/0093308 A1 Jul. 18, 2002

(30) Foreign Application Priority Data
Dec. 27, 2000 (FR) .............................. 00 17344

(51) Int. Cl.⁷ .................................. H02P 7/36
(52) U.S. Cl. .................. 318/811; 318/801; 318/802; 318/803; 318/804; 318/805; 318/806; 318/807; 318/808; 318/809; 318/810
(58) Field of Search ................................ 318/801–811

(56) References Cited

U.S. PATENT DOCUMENTS

| | | | | |
|---|---|---|---|---|
| 3,824,437 A | * | 7/1974 | Blaschke | 318/803 |
| 4,338,559 A | * | 7/1982 | Blaschke et al. | 318/805 |
| 4,388,577 A | * | 6/1983 | Blaschke et al. | 318/717 |
| 4,461,986 A | | 7/1984 | Maynard et al. | 318/778 |
| 4,484,128 A | * | 11/1984 | Jotten et al. | 318/805 |
| 4,764,712 A | | 8/1988 | Blaschke et al. | 318/778 |
| 4,904,919 A | | 2/1990 | McNaughton | 318/797 |
| 4,926,105 A | * | 5/1990 | Mischenko et al. | 318/800 |
| 5,717,305 A | | 2/1998 | Seibel et al. | 318/778 |
| 5,796,235 A | * | 8/1998 | Schrodl et al. | 318/801 |

* cited by examiner

Primary Examiner—Rita Leykin
(74) Attorney, Agent, or Firm—Parkhurst & Wendel, L.L.P.

(57) ABSTRACT

This invention relates to a system for limitation of the output current from a speed controller for three-phase asynchronous electric motors, comprising a PWM type converter in which the electronic switches are controlled by a microcontroller circuit (Mc), characterized by the fact that the microcontroller circuit comprises means (LIC) of calculating the modulus of the current vector using motor phase current measurements, and comparing it with a limitation set value in order to obtain a limitation error (y) and to calculate a correction voltage ($\Delta V$) that is added to the control voltage (V) applied to the motor.

4 Claims, 2 Drawing Sheets

SYSTEM FOR LIMITATION OF THE OUTPUT CURRENT FROM A SPEED CONTROLLER

This invention relates to a system for limitation of the output current from a speed controller for three-phase asynchronous electric motors comprising a current converter bridge in which the electronic switches are controlled by a microcontroller.

A speed controller for a three-phase asynchronous motor comprises a voltage converter together with an uncontrolled rectifier and a capacitive filter. A typical converter is controlled by Pulse Width Modulation that consists of outputting a series of positive or negative fixed amplitude pulses modulated in width to the motor. There are several known processes for achieving Pulse Width Modulation. In sine-delta modulation, a sinusoidal reference wave with the required voltage frequency and a proportional amplitude is compared with a delta modulated wave with a significantly higher frequency. The intersections of the two curves give the closing and opening times of electronic switches in the converter respectively and in real time. Hysteresis modulation is another means of achieving Pulse Width Modulation.

U.S. Pat. No. 4,904,919 describes a system combining the advantages of the PWM sine-delta converter and the advantages of the PWM-hysteresis. A circuit measures the current and compares it with a limiting positive value and a limiting negative value of the current. If the current exceeds its limiting positive value, a predetermined negative value is added to the current reference. If the current drops below this limit, the action of the said negative value is still valid. In the fall phase, there is a threshold below which the action of the negative value is deactivated.

In this dual system, hysteresis modulation operates in series with sine-delta modulation. If the current drops below its limit, hysteresis modulation is inactive and sine-delta modulation is active. However if the current exceeds its limit, hysteresis modulation is active in the sense that it modifies the reference current that then acts on the regulation loop, and therefore on the PWM reference voltage. In other words, in practice switching to hysteresis mode activates it, and switching to the other direction deactivates it while leaving sine-delta PWM active.

This solution clips the current in each phase separately which induces a vibration motor torque. The current oscillates within a wide band which generates additional oscillations in the torque and thus significantly reduces the efficiency of the motor.

In terms of converter components, if each phase is limited independently, the result is that each power component (switches, diodes) in the converter can be protected individually. But the total dissipated power depends directly on the modulus of the current vector. The modulus of this current vector always remains greater than the limiting value and the load on power components is thus greater such that their life could be affected.

The purpose of this invention is to provide a function for instantaneous limitation of the current at the output from the controller while keeping the currents sinusoidal. This function is made by software and the micro-controller independently of the type of the main control used in the speed controller. It protects the converter bridge, eliminates torque ripples and thus extends the life of the motor. No additional hardware components are necessary, the layout of the current limitation only requires a small amount of memory space and little microcontroller execution time. Current limitation is more reliable, more intelligent and less expensive. During limitation, the modulus of the current vector is kept equal to the limiting value, which extends the life of power components in the converter.

The system according to the invention is characterized by the fact that the microcontroller circuit comprises means of calculating the modulus of the current vector from measurements of motor phase currents, and comparing it with a limiting set value in order to obtain a limitation error and means of calculating a correction voltage that is added to the control voltage applied to the motor.

According to one characteristic, the system comprises means of starting from the limitation error and using a floating action controller to calculate a control variable, and means of multiplying this control variable by phase currents in order to obtain the correction voltage for each phase to obtain sinusoidal limitation currents.

We will now describe the invention in more detail with reference to an embodiment given as an example and represented in the attached drawings in which.

Figure 1:
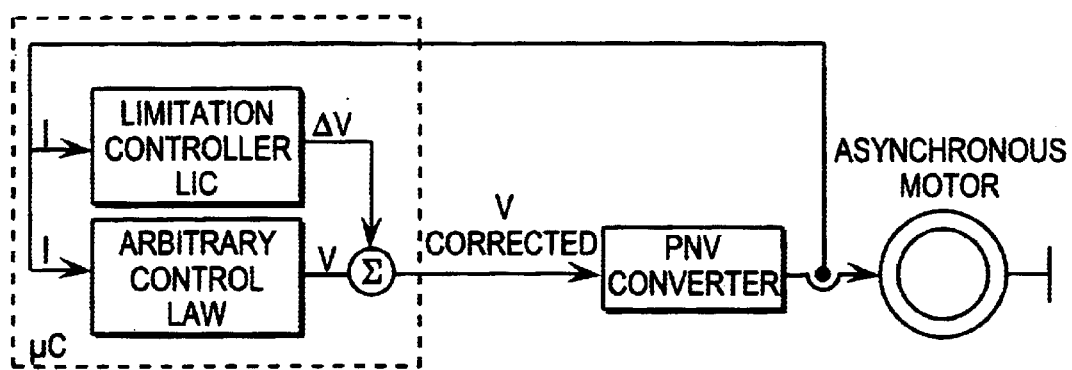
FIG. 1 is a functional diagram of a converter in which the current limitation system according to the invention is fitted.

With reference to FIG. 1, the controller comprises a PWM type converter outputting pulses to the asynchronous motor and associated with an arbitrary voltage control law (scalar, vector, etc.). The electronic switches on this converter are controlled by a control circuit, particularly comprising a microcontroller Mc.

Figure 2:
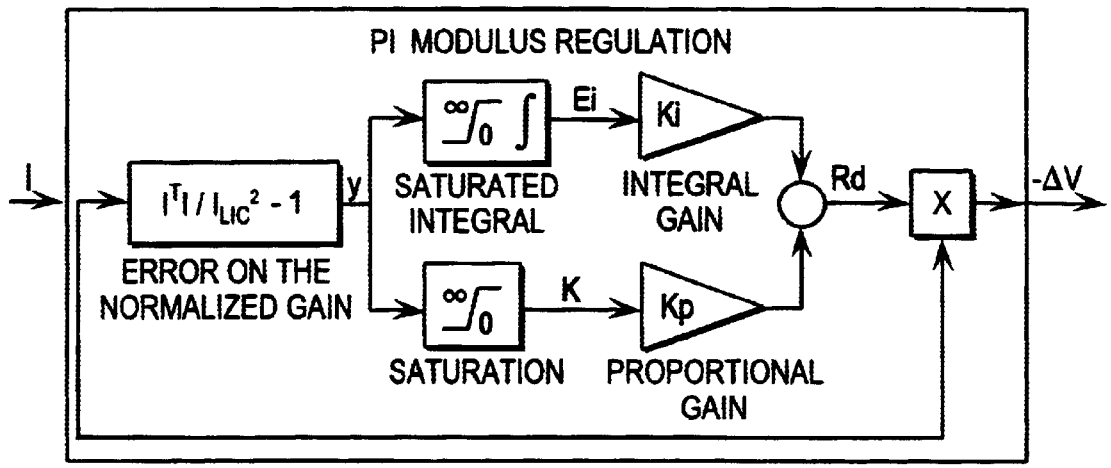
FIG. 2 is a block diagram of the current limitation system according to the invention.

The microcontroller circuit Mc periodically receives current signals I output by sensors Ci in motor phases. These currents are processed by a limitation function LIC shown in FIG. 2.

The limitation function LIC determines the modulus of the current vector by calculating the square root of the sum of the squares of each phase current. It then compares the modulus of the current vector with a limitation set value and calculates the difference or the limitation error, denoted y, that is a scalar.

The limitation function LIC uses the limitation error y to calculate a control variable Rd (that is similar to a pure resistance), using a floating action controller PI.

The current limitation function LIC comprises saturation means preventing the control variable Rd from becoming negative.

The current limitation function LIC multiplies the control variable Rd by phase currents to output a correction voltage $\Delta V$ for each phase. This correction voltage $\Delta V$ is subtracted from the voltage reference V output by the control law to provide corrected reference voltages $V_{corrected}$ that are applied to the motor through the converter. As a result, the currents remain sinusoidal even in limitation.

The gains of the controller PI can be determined analytically based on the motor parameters. The gains are determined such that the controller remains robust even if the motor parameters change.

The call frequency of the LIC function is sufficiently high that currents are limited instantaneously.

Figure 3:
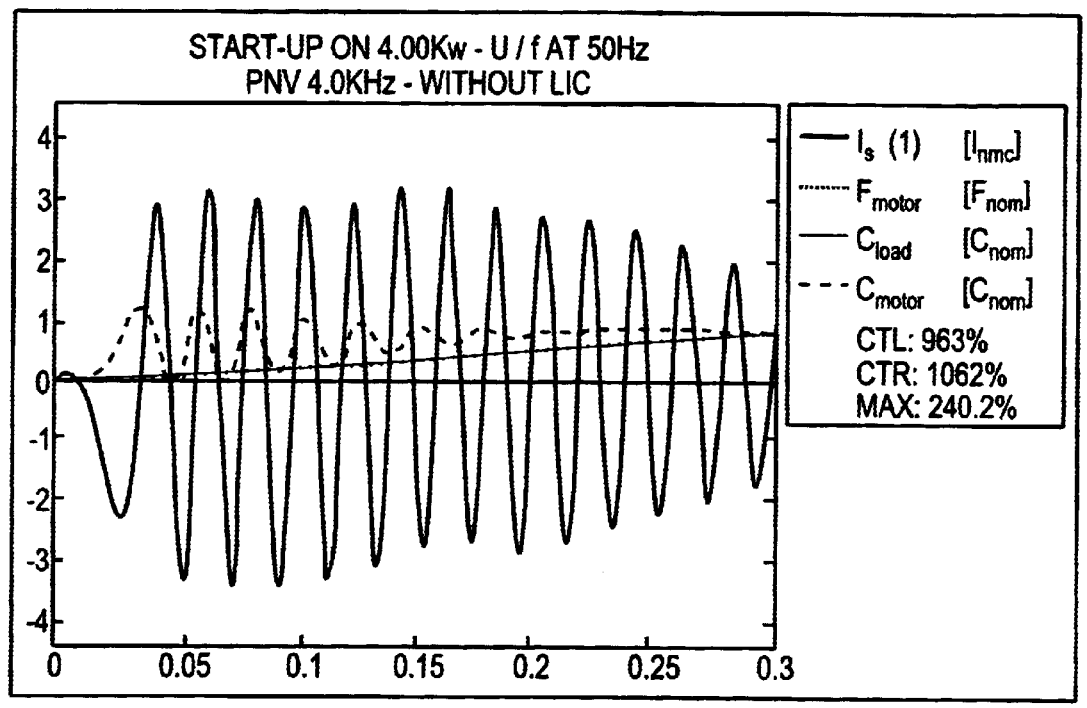
FIG. 3 is a diagram showing characteristics as a function of time for a converter without current limitation system during a start-up phase at no load.
Figure 4:
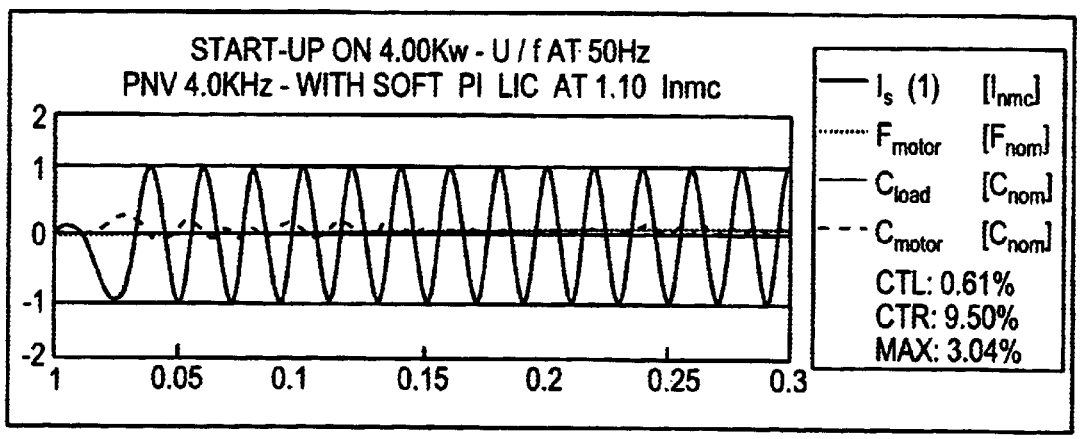
FIG. 4 is a diagram showing characteristics as a function of time for a converter according to the invention during a start-up phase at no load.

FIGS. 3 and 4 illustrate an example of the result obtain with the LIC current limitation function according to the invention.

FIG. 3 represents start-up of an asynchronous motor at no load and at nominal voltage and frequency, without the LIC limitation function. The peak current in one phase reaches three times the nominal peak current in the motor (curve Is).

FIG. 4 represents start-up with this LIC function and with the limiting current fixed at 1.1 times the nominal value. The current in one phase is actually limited to this value (curve Is) and remains perfectly sinusoidal.

Obviously, it would be possible to imagine alternatives and improvements to detail, and even to envisage the use of equivalent means, without going outside the framework of the invention.

The system according to the invention can be applied to a controller with or without a speed sensor. The function performed by a microcontroller can be done using electronic components.

What is claimed is:

1. A system for limitation of output current from a speed controller for three-phase asynchronous electric motors, comprising:

a PWM type converter having electronic switches controlled by a microcontroller circuit, wherein the microcontroller circuit comprises means for calculating the modulus of a current vector from current measurements in phases of a motor for receiving a control voltage, and comparing the modulus with a limitation set value to obtain a limitation error, and means for calculating a correction voltage for addition to the control voltage applied to the motor.

2. The system according to claim 1, comprising means for using the limitation error to calculate a control variable using a computational controller, and means for multiplying the control variable by the motor phase currents to obtain the correction voltage for each phase and to obtain sinusoidal limitation currents.

3. A system for limitation of output current from a speed controller for three-phase asynchronous electric motors, comprising:

a PWM type converter having electronic switches controlled by a microcontroller circuit, wherein the microcontroller circuit comprises means for calculating the modulus of a current vector by the square root of the sum of the squares of each phase current, and comparing the modulus with a limitation set value to obtain a limitation error, and means for calculating a correction voltage for addition to a control voltage applied to the motor.

4. The system according to claim 3, wherein the current limitation means comprises saturation means for preventing the control variable from becoming negative.

* * * * *